US012060247B2

(12) United States Patent
Pahlke

(10) Patent No.: US 12,060,247 B2
(45) Date of Patent: Aug. 13, 2024

(54) ELEVATOR CAR LEVELING SENSOR

(71) Applicant: OTIS ELEVATOR COMPANY, Farmington, CT (US)

(72) Inventor: Derk Oscar Pahlke, Berlin (DE)

(73) Assignee: OTIS ELEVATOR COMPANY, Farmington, CT (US)

( * ) Notice: Subject to any disclaimer, the term of this patent is extended or adjusted under 35 U.S.C. 154(b) by 1578 days.

(21) Appl. No.: 16/164,226

(22) Filed: Oct. 18, 2018

(65) Prior Publication Data

US 2020/0122963 A1 Apr. 23, 2020

(51) Int. Cl.

| | |
|---|---|
| ***B66B 1/34*** | (2006.01) |
| ***B66B 1/28*** | (2006.01) |
| ***B66B 3/00*** | (2006.01) |
| ***B66B 5/00*** | (2006.01) |
| ***B66B 5/02*** | (2006.01) |

(52) U.S. Cl.

CPC .............. *B66B 1/3492* (2013.01); *B66B 1/28* (2013.01); *B66B 3/002* (2013.01); *B66B 5/0018* (2013.01); *B66B 5/02* (2013.01)

(58) Field of Classification Search

CPC ... B66B 1/24; B66B 1/28–308; B66B 1/3492; B66B 1/36; B66B 1/40; B66B 1/44; B66B 5/00; B66B 5/0006; B66B 5/0037; B66B 5/02–022; B66B 5/25; B66B 5/12–145; B66B 7/028; B66B 7/041–045; B66B 7/048

See application file for complete search history.

(56) References Cited

U.S. PATENT DOCUMENTS

| | | | | |
|---|---|---|---|---|
| 4,750,592 | A | 8/1988 | Watt | |
| 5,544,721 | A * | 8/1996 | Roberts | B66B 7/046 187/292 |
| 5,659,159 | A | 8/1997 | Koopman, Jr. | |
| 5,889,239 | A | 3/1999 | Blackaby et al. | |
| 6,701,277 | B2 | 3/2004 | Coste et al. | |
| 6,874,244 | B2 | 4/2005 | Birrer et al. | |
| 6,988,594 | B2 | 1/2006 | Deplazes et al. | |
| 7,077,244 | B2 | 7/2006 | Oh et al. | |
| 7,350,625 | B2 | 4/2008 | Deplazes et al. | |
| 7,441,631 | B2 | 10/2008 | Oh et al. | |

(Continued)

FOREIGN PATENT DOCUMENTS

| | | | |
|---|---|---|---|
| CN | 105060043 | A | 11/2015 |
| CN | 105984791 | A | 10/2016 |

(Continued)

OTHER PUBLICATIONS

EP Search Report; Issued: Apr. 8, 2020; Application No. 19203415.5; Filed: Oct. 15, 2019; 8 pages.

*Primary Examiner* — Christopher Uhlir

(74) *Attorney, Agent, or Firm* — CANTOR COLBURN LLP

(57) ABSTRACT

Methods and systems for elevator car level detection are provided. Aspects includes collecting, by at least one sensor, horizontal distance data and vertical distance data associated with a component of an elevator car in relation to a floor landing in a hoistway of a building, wherein the at least on sensor is affixed to the component of the elevator car and analyzing the horizontal distance data and the vertical distance data to determine one or more offset values associated with the elevator car and the floor landing.

20 Claims, 4 Drawing Sheets

(56) References Cited

U.S. PATENT DOCUMENTS

| | | | |
|---|---|---|---|
| 7,493,991 B2 | 2/2009 | Oh et al. | |
| 7,546,903 B2 | 6/2009 | Kattainen et al. | |
| 7,571,791 B2 | 8/2009 | Finn et al. | |
| 7,588,127 B2 | 9/2009 | Shiratsuki et al. | |
| 7,600,613 B2 | 10/2009 | Kang et al. | |
| 7,669,698 B2 | 3/2010 | Jahkonen | |
| 7,699,143 B2 | 4/2010 | Tschuemperlin et al. | |
| 8,447,433 B2 | 5/2013 | Reynolds | |
| 9,033,114 B2 | 5/2015 | Mizon | |
| 9,469,501 B2 | 10/2016 | Lee | |
| 9,745,170 B2 | 8/2017 | Roussel | |
| 10,315,885 B2 * | 6/2019 | Kinnari | B66B 19/007 |
| 10,982,944 B1 * | 4/2021 | Bhandari | B81B 7/02 |
| 2005/0039987 A1 | 2/2005 | Redden | |
| 2008/0156591 A1 | 7/2008 | Tracey | |
| 2011/0168496 A1 * | 7/2011 | Bunter | B66B 13/143<br>187/247 |
| 2017/0015521 A1 * | 1/2017 | Toutaoui | B66B 5/02 |
| 2017/0349399 A1 | 12/2017 | Sonnenmoser et al. | |
| 2018/0237261 A1 | 8/2018 | Herkel et al. | |
| 2021/0347605 A1 * | 11/2021 | Yoshino | B66B 5/0087 |

FOREIGN PATENT DOCUMENTS

| | | | |
|---|---|---|---|
| CN | 111071878 | A | 4/2020 |
| EP | 3517474 | A1 | 7/2019 |
| EP | 3647248 | A1 | 5/2020 |
| JP | H07215634 | A | 8/1995 |
| JP | 2004307098 | A | 11/2004 |
| WO | 2007039750 | A2 | 4/2007 |

* cited by examiner

ELEVATOR CAR LEVELING SENSOR

BACKGROUND

The subject matter disclosed herein generally relates to elevator systems and, more particularly, to a system for elevator car leveling utilizing sensors.

The leveling accuracy of an elevator car at a landing can aide an elevator passenger' elevator experience. Leveling accuracy is measured, typically, in terms of a differential between the floor of an elevator car and the landing floor. Typically, elevator systems are constantly monitoring the leveling accuracy of each elevator car utilizing an individual wired sensor at each landing. These wired sensors typically have a high material and installation cost associated with them.

BRIEF DESCRIPTION

According to one embodiment, a system is provided. The system includes a controller coupled to a memory, at least one sensor affixed to a component of the elevator car operating in a hoistway of a building and wherein the controller is configured to receive, from the at least one sensor, horizontal distance data and vertical distance data associated with the moving component of the elevator car in relation to a floor landing in the hoistway of the building and analyze the horizontal distance data and the vertical distance data to determine one or more offset values associated with the elevator car and the floor landing.

In addition to one or more of the features described above, or as an alternative, further embodiments of the system may include that the at least on sensor comprises an accelerometer and that the at least one sensor is configured to collect horizontal distance data and vertical distance data responsive to a first output of the accelerometer.

In addition to one or more of the features described above, or as an alternative, further embodiments of the system may include that the at least one sensor is configured to operate in a low power mode responsive to a second output of the accelerometer.

In addition to one or more of the features described above, or as an alternative, further embodiments of the system may include that the at least one sensor collects horizontal distance data and vertical distance data for a first period of time.

In addition to one or more of the features described above, or as an alternative, further embodiments of the system may include that the at least one sensor is configured to operate in a low power mode after the expiration of the first period of time.

In addition to one or more of the features described above, or as an alternative, further embodiments of the system may include that the at least one sensor comprises a power supply.

In addition to one or more of the features described above, or as an alternative, further embodiments of the system may include that the power supply comprises a battery.

In addition to one or more of the features described above, or as an alternative, further embodiments of the system may include that the power supply comprises an energy harvesting circuit.

In addition to one or more of the features described above, or as an alternative, further embodiments of the system may include that the at least one sensor comprises at least one of an accelerometer, a hall sensor, an ultrasonic sensor, and a capacitance sensor.

In addition to one or more of the features described above, or as an alternative, further embodiments of the system may include that the one or more offset values comprises a horizontal offset and a vertical offset.

In addition to one or more of the features described above, or as an alternative, further embodiments of the system may include that the controller is further configured to enact an action related to the elevator car responsive to determining the one or more offset values exceed an offset threshold.

In addition to one or more of the features described above, or as an alternative, further embodiments of the system may include that the action comprises generating an alert.

In addition to one or more of the features described above, or as an alternative, further embodiments of the system may include that the action comprises adjusting an operation of the elevator car.

According to one embodiment, a method is provided. The method includes collecting, by at least one sensor, horizontal distance data and vertical distance data associated with a component of an elevator car in relation to a floor landing in a hoistway of a building, wherein the at least on sensor is affixed to the component of the elevator car and analyzing the horizontal distance data and the vertical distance data to determine one or more offset values associated with the elevator car and the floor landing.

In addition to one or more of the features described above, or as an alternative, further embodiments of the method may include that the at least on sensor comprises an accelerometer and that the at least one sensor is configured to collect horizontal distance data and vertical distance data responsive to a first output of the accelerometer.

In addition to one or more of the features described above, or as an alternative, further embodiments of the method may include that the at least one sensor is configured to operate in a low power mode responsive to a second output of the accelerometer.

In addition to one or more of the features described above, or as an alternative, further embodiments of the method may include that the at least one sensor collects horizontal distance data and vertical distance data for a first period of time and that the at least one sensor is configured to operate in a low power mode after the expiration of the first period of time.

In addition to one or more of the features described above, or as an alternative, further embodiments of the method may include that the at least one sensor comprises a power supply and that the power supply comprises a battery or an energy harvesting circuit.

In addition to one or more of the features described above, or as an alternative, further embodiments of the method may include that the at least one sensor comprises at least one of an accelerometer, a hall sensor, an ultrasonic sensor, and a capacitance sensor.

In addition to one or more of the features described above, or as an alternative, further embodiments of the method may include that the one or more offset values comprises a horizontal offset and a vertical offset.

BRIEF DESCRIPTION OF THE FIGURES

The present disclosure is illustrated by way of example and not limited in the accompanying figures in which like reference numerals indicate similar elements.

DETAILED DESCRIPTION

Figure 1:
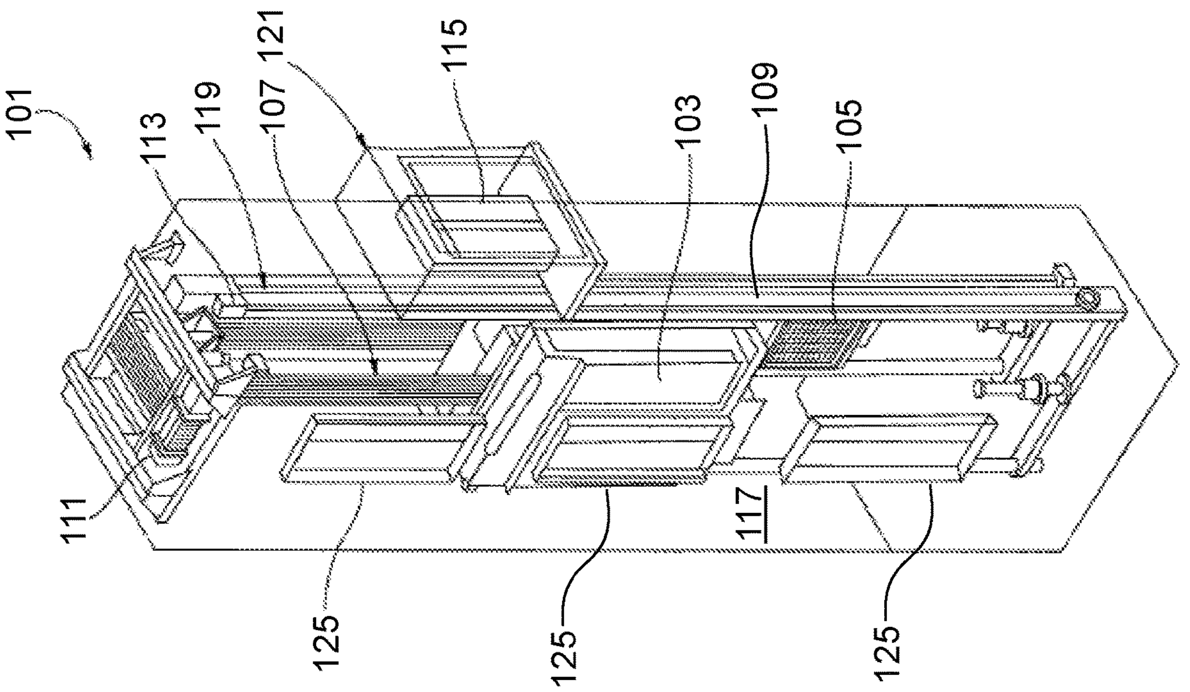
FIG. 1 is a schematic illustration of an elevator system that may employ various embodiments of the disclosure.

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element “a” that is shown in FIG. X may be labeled “Xa” and a similar feature in FIG. Z may be labeled “Za.” Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

FIG. 1 is a perspective view of an elevator system 101 including an elevator car 103, a counterweight 105, a roping 107, a guide rail 109, a machine 111, a position encoder 113, and a controller 115. The elevator car 103 and counterweight 105 are connected to each other by the roping 107. The roping 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft 117 and along the guide rail 109.

The roping 107 engages the machine 111, which is part of an overhead structure of the elevator system 101. The machine 111 is configured to control movement between the elevator car 103 and the counterweight 105. The position encoder 113 may be mounted on an upper sheave of a speed-governor system 119 and may be configured to provide position signals related to a position of the elevator car 103 within the elevator shaft 117. In other embodiments, the position encoder 113 may be directly mounted to a moving component of the machine 111, or may be located in other positions and/or configurations as known in the art.

The controller 115 is located, as shown, in a controller room 121 of the elevator shaft 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position encoder 113. When moving up or down within the elevator shaft 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor.

Although shown and described with a roping system, elevator systems that employ other methods and mechanisms of moving an elevator car within an elevator shaft, such as hydraulic and/or ropeless elevators, may employ embodiments of the present disclosure. FIG. 1 is merely a non-limiting example presented for illustrative and explanatory purposes.

Figure 2:
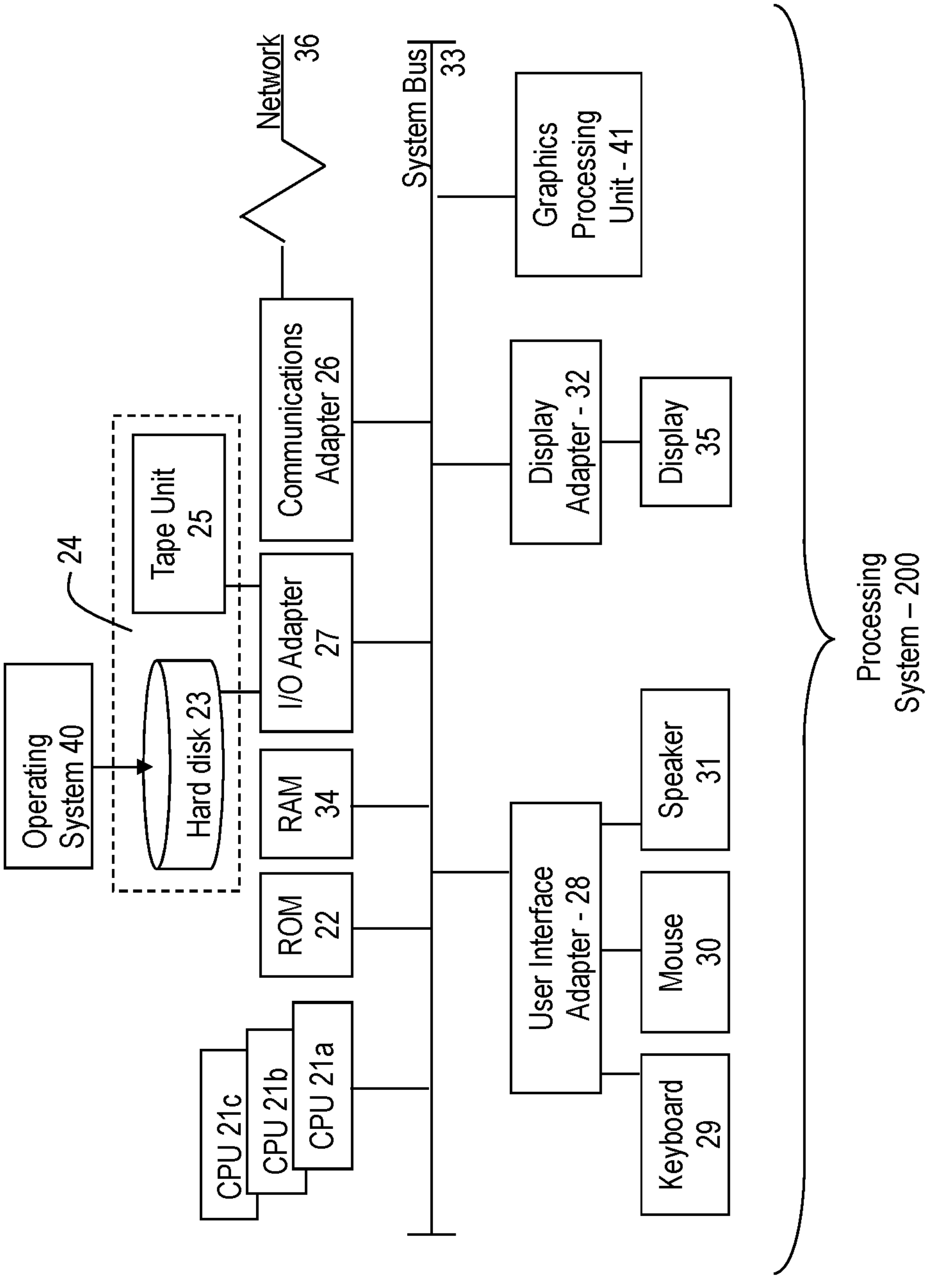
FIG. 2 depicts a block diagram of a computer system for use in implementing one or more embodiments of the disclosure.

Referring to FIG. 2, there is shown an embodiment of a processing system 200 for implementing the teachings herein. In this embodiment, the system 200 has one or more central processing units (processors) 21*a*, 21*b*, 21*c*, etc. (collectively or generically referred to as processor(s) 21). In one or more embodiments, each processor 21 may include a reduced instruction set computer (RISC) microprocessor. Processors 21 are coupled to system memory 34 (RAM) and various other components via a system bus 33. Read only memory (ROM) 22 is coupled to the system bus 33 and may include a basic input/output system (BIOS), which controls certain basic functions of system 200.

FIG. 2 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 200 may be stored in mass storage 24. A network communications adapter 26 interconnects bus 33 with an outside network 36 enabling data processing system 200 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 200 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel. The processing system 200 described herein is merely exemplary and not intended to limit the application, uses, and/or technical scope of the present disclosure, which can be embodied in various forms known in the art.

Thus, as configured in FIG. 2, the system 200 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system coordinate the functions of the various components shown in FIG. 2. FIG. 2 is merely a non-limiting example presented for illustrative and explanatory purposes.

Turning now to an overview of technologies that are more specifically relevant to aspects of the disclosure, typical elevator car leveling systems include a wired sensor that requires a wired power source as well as costly installation due to the connection requirements for the wired sensors. Often, these wired sensors measure the leveling accuracy of an elevator car with a floor landing indirectly using magnets and the like. A need exists for low cost and easy to install sensors that can determine leveling accuracy for an elevator car.

Turning now to an overview of the aspects of the disclosure, one or more embodiments address the above-described shortcomings of the prior art by providing systems and methods for elevator car level detection. In one or more embodiments, a sensor can be installed on the elevator car in facing the gap between an elevator car and a landing floor that can provide sensor data associated with the levelling for the elevator car. No additional reference points e.g. magnets are needed. Levelling refers to both the vertical and horizontal differential between the floor of an elevator car and the floor at a landing floor. This vertical differential and the horizontal differential is preferred to be minimized for operational and safety concerns. In some embodiments, the vertical levelling accuracy for an elevator car can be measured at where the elevator car stops (e.g., stopping accuracy) and where the elevator car relevels itself after stopping (e.g., re-levelling accuracy).

Figure 3:
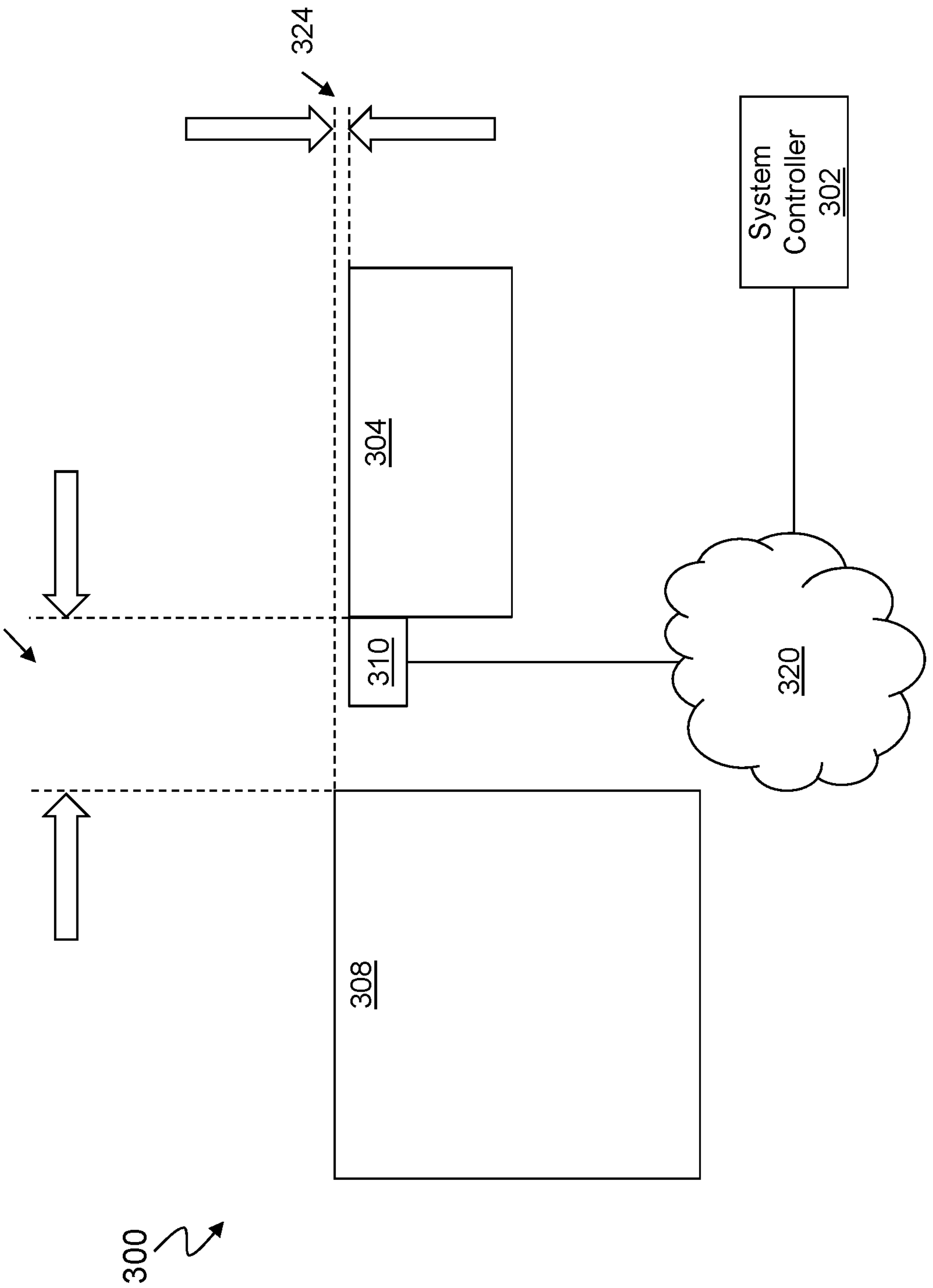
FIG. 3 depicts a system 300 for elevator car leveling determination according to one or more embodiments.

Turning now to a more detailed description of aspects of the present disclosure, FIG. 3 depicts a system 300 for elevator car leveling determination according to one or more embodiments. The system 300 includes a system controller 302 and a sensor 310. The system 300 can be utilized for determining a floor alignment level between the floor of an elevator car 304 and a floor landing 308 in an elevator system. The elevator system can be operated at a building that includes a number of floors serviced by an elevator car 304. Each floor has an associated floor landing 308. While the illustrated example shows only one sensor 310, one landing 308, and one elevator car 304, multiple landings, sensors, and elevator cars can be utilized for the system 300. The sensor 310 is affixed to an elevator car 304 operating within a hoistway in the elevator system. The system 300 utilizes the sensor 310 to collect data associated with the vertical offset 322 between the elevator car 304 and the landing floor 308. Also, the sensor 310 collects data associated with the horizontal offset 324. In one or more embodiments, the system controller 302 can be any of a combination of the elevator system controller, one or more processing circuits within the sensor 310, a controller located on or near the elevator system, or one or more controllers on a local network or cloud server.

In one or more embodiments, the sensor 310 includes a combination of three sensor technologies that are configured to detect motion of the elevator car, detect horizontal distance between the elevator car 304 and the floor landing 308, and detect vertical distance between the elevator car 304 floor and the floor landing 308 floor (e.g., vertical offset). For the motion detection, an accelerometer sensor can be utilized, for example. For horizontal distances, an ultrasonic sensor in direct or indirect reflection mode or a hall sensor can be utilized, for example. Any type of sensor can be utilized for measuring horizontal distances include laser range finding sensors and the like. And for detecting vertical distances, a level sensor can be utilized. Level sensor, for example, can include a capacitance sensor. In one or more embodiments, this combination of sensors is utilized by the system controller 302 to first determine that the elevator car 304 is at or approaching the floor landing 308. Once determined, the system controller 302 can operate the sensor 310 to collect sensor data regarding the horizontal distance between the floor landing 308 and the elevator car 304. In other embodiments, the sensor 310 can transmit sensor data to the system controller 302 when approaching a floor landing without the need from any operation by the system controller 302. This horizontal distance can be referred to herein as the horizontal offset 322 as shown in FIG. 3. That is to say, the system controller 302 can determine the gap between the floor landing 308 and the elevator car 304 based on the sensor data. Gaps that are above a certain threshold gap could represent tripping hazards and other hazards for a user of the elevator car 304. These gap distances can be stored in a system memory for the system controller 302 or in a cloud server (not shown). Over time, the gap distance data can be analyzed to determine and learn patterns for drift in the elevator system that could trigger a maintenance request or repair request. In some embodiments, should the gap distance exceed a threshold gap, the system controller 302 can generate an alert or an action to be taken. For example, if the gap distance is a tripping hazard, the alert can be sent to a building manager and an elevator technician. An example action that can be taken includes the changing of elevator car 304 operations such as, for example, shutting down the elevator car 304 for maintenance. In one or more embodiments, the sensor 310 can transmit sensor data director to the system controller 302 or through a local or cloud network to the system controller 302. The sensor 310 can transmit the sensor data without any inputs from an external control system. For example, the sensor 310 can be configured to transmit sensor data based on a triggering event such as a wake up event. Also, the sensor 310 can be configured to transmit sensor data periodically for a set or variable period of time to the system controller 302 without any inputs or transmissions from the system controller 302. In this sense, the sensor 310 has a one-way communication with the system controller 302.

In one or more embodiments, the system controller 302 also operates the sensor 310 to collect vertical distance data associated with the elevator car 304 and the floor landing 308. This vertical distance data can be analyzed to determine the vertical offset 304 between the floor of the elevator car 304 and the floor landing 308. While in the illustrated example, the vertical offset 324 shows the elevator car 304 to be lower than the floor landing 308, in other examples, the elevator car 304 could be above the floor landing 308. Vertical offset 324 calculations that are above a threshold vertical distance could represent a tripping hazard or other hazard for a user of the elevator car 304. If the vertical offset 324 exceeds the threshold vertical distance, an action or alert can be generated by the system controller 302. The action can include the shutting down of the elevator or sounding an alarm or visual alert for a building manager, users of the elevator car 304, and/or an elevator technician. The vertical offset 324 can be stored in a system memory by the system controller 302 or in a cloud server. This historical vertical offset data can be utilized to predict maintenance issues and repairs. For example, if the vertical offset 324 at each floor shows a pattern of increasing, this can be an indication of a necessary repair to avoid the vertical offset 324 becoming a future problem. This predictive analysis allows for scheduling of repairs at non-peak times because an elevator car 304 can still be operated safely, but the pattern of the vertical offset 324 distances is still below a defined threshold for safety.

In one or more embodiments, to calculate the vertical offset, a capacitive response of the landing floor detected by the sensor installed on the elevator car (facing the landings) can be a function of the distance to the landing as well as the level (height) in respect to the landing. In one or more embodiments, a formula for calculating the vertical offset can include:

$$C = \left( \frac{Const1}{1 + e^{\frac{L}{H/Const2}}} \right) * \left( \frac{1}{(H/Const2)\hat{}2} \right) \tag{1}$$

With respect to formula (1), C is the capacitive signal, Const1 and Const2 are constants, L is the vertical level, and H is the horizontal distance. This allows to detect the vertical level out of the capacitive signal C using the following formula (2):

$$L = \left( \ln \frac{(Const1)}{\left( \frac{H}{Const2} \right)} - C/C \right) * \frac{H}{Const2} \tag{2}$$

In one or more embodiments, the sensors 310 includes a power supply that allows for autonomous installation on the elevator car 304 (i.e., no wired power connection is needed). The power supply can include a battery or a power harvesting circuit. To extend the life of the power supply, the sensor 310 can be operated by the system controller 302 in a low power mode and an operation mode. In one or more embodiments, the sensor 310 can be preprogrammed and/or configured to operate in the low power mode and/or the operation mode. When the horizontal and vertical distances do not need to be measured, the sensor 310 can be operated or configured to be operated in the low power mode which has the sensor 310 drawing quiescent power from the power supply. The operational mode for the sensor can be triggered by a "wake-up" event from an output of the accelerometer within the sensor 310. This wake-up event can include a velocity and/or acceleration detection threshold. For example, the elevator car 304 while not moving can be determined by the accelerometer to not be moving (e.g., sifting at floor landing and waiting for an elevator car signal). A wake-up event could include the initiation of movement by the elevator car 304 which causes the system controller 302 to transition the sensor 310 to the operational mode that collects sensor data related to the horizontal offset 322 and the vertical offset 324 of the elevator car 304 in relation to the floor landing 308. The sensor 310, while in operational mode, can transmit the sensor data to the system controller 302 for processing and calculation of the vertical 324 and horizontal 322 offsets. The sensor 310 can return to the low power mode based on a triggering by the system controller 302 or after the expiration of a set amount of time. For example, when the accelerometer output represents a wake-up event, the sensor 310 transitions to the operational mode and collects and transmits the sensor data to the system controller 302 for processing. A timer can be set by the system controller 302 or on the sensor 310 and at the expiration of the timer, the sensor 310 transitions back to the low power mode to conserve energy. In other embodiments, the sensor 310 can wakeup based on an accelerometer on the elevator doors that can detect the doors opening and the sensor 310 can read the levelling. In yet another embodiment, the sensor 310, after waking up, can collect sensor data for a period of time after the elevator car 304 is stopped, e.g. 10 seconds and then returns to low power mode.

In one or more embodiments, the wake up event can include an operation of the elevator car 304 to show the initiation of movement but the wake up event occurs when the elevator car 304 begins to slow down indicating the elevator car 304 is approaching the floor landing 308. A number of velocity and acceleration thresholds can be set to determine that the elevator car 304 is approaching the floor landing 308. This velocity and acceleration data can be collected by the accelerometer. The sensor 310 power supply life can be extended by collecting the horizontal and vertical distance data only when the elevator car is at or near the floor landing 308. In one or more embodiments, the sensor 310 can collect sensor data during the stopping operation of the elevator car 304 as well as the re-levelling operation of the elevator car 304. When an elevator car 304 is dispatched to a floor landing, the elevator car 304 first attempts to stop close to the floor landing 308 and then readjust its position based on the sensor data collected from the sensor 310. This relevelling allows for a safer departure for the users of the elevator car 304. The vertical offset 324 can be determined in both instances. That is to say, the system controller 302 analyzes both the stopping leveling vertical offset and the relevelling vertical offset and stores these values in memory. Both the stopping leveling vertical offset data and the relevelling vertical offset can be utilized for analysis and prediction of future predictive maintenance and repairs as well as hazardous conditions if exceeding certain thresholds.

In one or more embodiments, the system controller 302, system controller 302, and sensor 310 can be implemented on the processing system 200 found in FIG. 2. Additionally, a cloud computing system can be in wired or wireless electronic communication with one or all of the elements of the system 300. Cloud computing can supplement, support or replace some or all of the functionality of the elements of the system 300. Additionally, some or all of the functionality of the elements of system 300 can be implemented as a node of a cloud computing system. A cloud computing node is only one example of a suitable cloud computing node and is not intended to suggest any limitation as to the scope of use or functionality of embodiments described herein.

In one or more embodiments, the sensor 310 can be affixed to a component of the elevator car 304 such as, for example, the top portion of the elevator car 304 or the bottom or side portions of the elevator car 304. In yet another embodiment, the sensor 310 can be affixed to the door header of the elevator car and positioned such that the sensor 310 can collect horizontal and vertical distance data at each floor landing 308 in a building hoistway. In other embodiments, the sensor 310 can be placed where it can see the floor level edge. Thus it can be placed on the bottom side of the elevator as close as possible to the car floor level edge facing landing 308.

Figure 4:
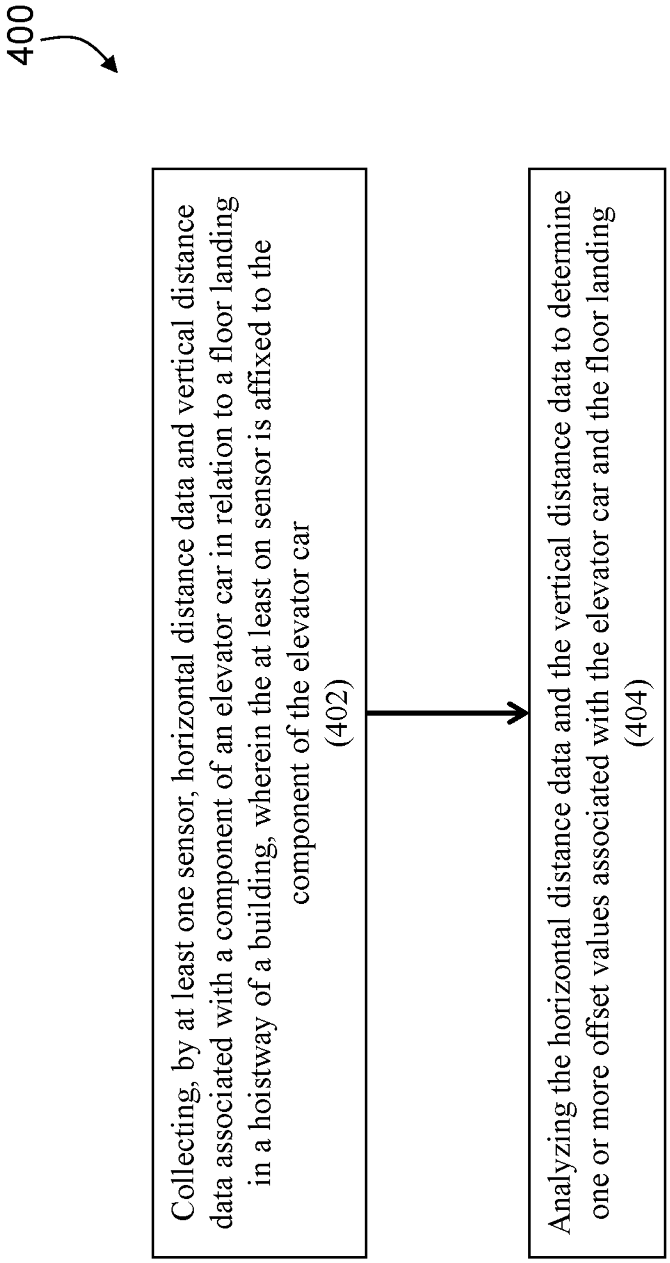
FIG. 4 depicts a flow diagram of a method for elevator car leveling determination according to one or more embodiments of the disclosure.

FIG. 4 depicts a flow diagram of a method for elevator car level detection according to one or more embodiments. The method 400 includes receiving, from the least one sensor, horizontal distance data and vertical distance data associated with a moving component of an elevator car in relation to a floor landing in a hoistway of a building, wherein the at least on sensor is affixed to the moving component of the elevator car, as shown in block 402. And at block 404, the method 400 includes analyzing the horizontal distance data and the vertical distance data to determine one or more offset values associated with the elevator car and the floor landing. The at least one sensor is configured to operate in a low power mode and an operation mode. In one or more embodiments, the low power mode can be the default mode for the at least one sensor 310 and the sensor 310 changes to operation mode based on a wake up event. The wake up event can be an output from an accelerometer associated with the at least on sensor 310. In one or more embodiments, the controller can report vertical and horizontal offsets that exceed a threshold offset value (e.g., 5 cm). The report can be to a building manager, an elevator monitoring system, or to an elevator technician. The controller can also generate alerts at or near the elevator car to warn passengers of a potential hazard. In other embodiments, the controller can change the operation of the elevator car based on the horizontal or vertical offsets exceeding one or more threshold values.

Additional processes may also be included. It should be understood that the processes depicted in FIG. 4 represent illustrations and that other processes may be added or existing processes may be removed, modified, or rearranged without departing from the scope and spirit of the present disclosure.

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An elevator system, the elevator system comprising:
- a controller coupled to a memory;
- at least one sensor affixed to an elevator car operating in a hoistway of a building; and
- wherein the controller is configured to:
  - receive, from the at least one sensor, horizontal distance data and vertical distance data associated with the elevator car in relation to a floor landing in the hoistway of the building, wherein both the horizontal distance data and the vertical distance data are determined in relation to the floor landing; and
  - analyze the horizontal distance data and the vertical distance data to determine one or more offset values corresponding to a distance between the elevator car and the floor landing;
  - wherein the horizontal distance data represents a distance along a horizontal direction between the elevator car and the floor landing and the and vertical distance data represents a distance along a vertical direction between the elevator car and the floor landing.

2. The elevator system of claim 1, wherein the at least one sensor comprises an accelerometer; and
- wherein the at least one sensor is configured to collect horizontal distance data and vertical distance data responsive to a first output of the accelerometer.

3. The elevator system of claim 2, wherein the at least one sensor is configured to operate in a low power mode responsive to a second output of the accelerometer.

4. The elevator system of claim 1, wherein the at least one sensor collects horizontal distance data and vertical distance data for a first period of time.

5. The elevator system of claim 4, wherein the at least one sensor is configured to operate in a low power mode after expiration of the first period of time.

6. The elevator system of claim 1, wherein the at least one sensor comprises a power supply.

7. The elevator system of claim 6, wherein the power supply comprises a battery.

8. The elevator system of claim 6, wherein the power supply comprises an energy harvesting circuit.

9. The elevator system of claim 1, wherein the at least one sensor comprises at least one of an accelerometer, a hall sensor, an ultrasonic sensor, and a capacitance sensor.

10. The elevator system of claim 1, wherein the one or more offset values comprises a horizontal offset and a vertical offset.

11. The elevator system of claim 1, wherein the controller is further configured to enact an action related to the elevator car responsive to determining the one or more offset values exceed an offset threshold.

12. The elevator system of claim 11, wherein the action comprises generating an alert.

13. The elevator system of claim 11, wherein the action comprises adjusting an operation of the elevator car.

14. A method for elevator car level detection, the method comprising:
- collecting, by at least one sensor, horizontal distance data and vertical distance data associated with an elevator car in relation to a floor landing in a hoistway of a building, wherein both the horizontal distance data and the vertical distance data are determined in relation to the floor landing, wherein the at least on sensor is affixed to the elevator car; and
- analyzing the horizontal distance data and the vertical distance data to determine one or more offset values corresponding to a distance between the elevator car and the floor landing;
- wherein the horizontal distance data represents a distance along a horizontal direction between the elevator car and the floor landing and the and vertical distance data represents a distance along a vertical direction between the elevator car and the floor landing.

15. The method of claim 14, wherein the at least one sensor comprises an accelerometer; and wherein the at least one sensor is configured to collect horizontal distance data and vertical distance data responsive to a first output of the accelerometer.

16. The method of claim 15, wherein the at least one sensor is configured to operate in a low power mode responsive to a second output of the accelerometer.

17. The method of claim 14, wherein the at least one sensor collects horizontal distance data and vertical distance data for a first period of time; and wherein the at least one sensor is configured to operate in a low power mode after expiration of the first period of time.

18. The method of claim 14, wherein the at least one sensor comprises a power supply; and wherein the power supply comprises a battery or an energy harvesting circuit.

19. The method of claim 14, wherein the at least one sensor comprises at least one of an accelerometer, a hall sensor, an ultrasonic sensor, and a capacitance sensor.

20. The method of claim 1, wherein the one or more offset values comprises a horizontal offset and a vertical offset.

* * * * *